United States Patent [19]

Martino et al.

[11] Patent Number: 5,307,202
[45] Date of Patent: Apr. 26, 1994

[54] SOFT COPY PORT

[75] Inventors: Ronald J. Martino, Geneva; Robert T. Shone, Pittsford; A. Lee Shawcross, Honeoye, all of N.Y.

[73] Assignee: Image Interpretation Systems Inc., Fairport, N.Y.

[21] Appl. No.: 3,784

[22] Filed: Jan. 13, 1993

[51] Int. Cl.⁵ .................. G02B 21/36; G02B 21/22
[52] U.S. Cl. .................. 359/363; 359/369; 359/462; 356/394; 356/397
[58] Field of Search ............. 359/362, 363, 369, 374, 359/375, 376, 378, 462, 63; 356/392, 393, 394, 397, 388

[56] References Cited

U.S. PATENT DOCUMENTS

| | | |
|---|---|---|
| 2,621,555 | 12/1952 | Fleming-Williams ............ 356/397 |
| 4,389,669 | 6/1983 | Epstein et al. ............ 356/394 |
| 4,568,252 | 2/1986 | Merstallinger et al. ............ 359/363 |
| 4,595,608 | 6/1986 | Hatae et al. ............ 359/363 |
| 4,786,154 | 11/1988 | Fantone et al. ............ 359/369 |
| 4,787,734 | 11/1988 | Matsumura ............ 359/377 |
| 4,871,245 | 10/1989 | Ishikawa et al. ............ 359/363 |
| 4,872,052 | 10/1989 | Liudzius et al. ............ 356/394 |
| 5,067,804 | 11/1991 | Kitajima et al. ............ 359/363 |
| 5,115,339 | 5/1992 | Martino et al. ............ 359/378 |

Primary Examiner—Edward K. Look
Assistant Examiner—Michael S. Lee
Attorney, Agent, or Firm—Bean, Kauffman & Spencer

[57] ABSTRACT

A stereoscope in which a digitally stored image can be seen through either or both eyepieces and compared with an object which can also be seen through either or both eyepieces. Digital images of objects can be stored. Both the images to be stored and the stored images can be digitally manipulated, i.e. magnified, rotated or warped.

22 Claims, 1 Drawing Sheet

SOFT COPY PORT

BACKGROUND OF THE INVENTION

The present invention relates to stereomicroscopes, and more particularly to stereomicroscopes used to detect differences between substantially identical photographs, either aerial photographs or photographic masks used by the semi-conductor industry.

U.S. Pat. No. 3,879,107, issued to Chaban Apr. 22, 1975, discloses a stereomicroscope of the type used to compare aerial photographs. The disclosed stereomicroscope has two optical systems with each system having a rhomboid arm used to position the respective objective over the pertinent portion of a respective aerial photograph. Each rhomboid arm contains an independent zoom system to produce an intermediate image which is then relayed through the respective optical system to a respective image rotator. A beamsplitter or mirror selectively placed at the intersection of the optical axes of the optical systems permits either mono or stereo presentation of the respective image from each rhomboid arm.

Stereomicroscopes of the type disclosed in the Chaban patent are conventionally used to compare two aerial photographs or a mask with a master, in connection with the preparation of semi-conductor wafers. The comparison is conducted by placing one of the photographs or wafer or mask under one rhomboid arm and the other photograph or wafer or mask under the other rhomboid arm. The rhomboid arms are then moved until substantially the same object is located in each photograph. The fields of view are then angularly adjusted by the operator, using the image rotators to rotate either or both images until they both have an identical orientation. The operator then adjusts either or both zoom systems until the sizes of the two images are identical. It may then be necessary to slightly reposition the rhomboid arms or one of the photographs or wafers or masks until the two fields of view are identical, which may also require a further repetition of the above described adjustment steps. Although not disclosed in the Chaban patent, it is conventional in such stereomicroscopes to permit superimposition of the images. That is, the image from one rhomboid arm is presented to both eyepieces and the image from the other rhomboid arm is presented to both eyepieces. Many operators prefer to use this superimposed mode to conveniently obtain proper orientation, image size and identical fields.

It is an object of the present invention to provide means for recording, as digital images, visual images being observed through a stereoscope.

It is another object of the present invention to provide means for magnifying, rotating and/or warping visual images as they are digitally recorded.

It is still another object of the present invention to permit means for introducing digitally recorded images as visual images into a stereoscope.

It is still another object of the present invention to provide means for magnifying, rotating and/or warping digitally recorded images as they are introduced as visual images into a stereoscope.

SUMMARY OF THE INVENTION AND DRAWINGS

A stereoscope having a port provided by a mirror selectively placed in the optical path of one of the stereoscope optical systems directs light to an area detector, such as a TV camera, which converts a visual image taken from the stereoscope to a digital image. A CPU, such as a conventional computer, is used to store the image on a disk, either hard, optical, or floppy, or to a tape. Such digitally stored images may be reintroduced into a stereoscope by converting the stored digital image to a visual image, commonly displayed on a CRT, which is then presented to a beamsplitter located on one of the stereoscope optical systems. The images may be magnified, rotated and/or warped during either or both conversions. Conventional software packages are available to store, magnify, rotate, warp and retrieve the digital images.

FIG. 1 is an optical diagram of a stereoscope according to the present invention.

DESCRIPTION OF THE PREFERRED EMBODIMENT

Figure 1:
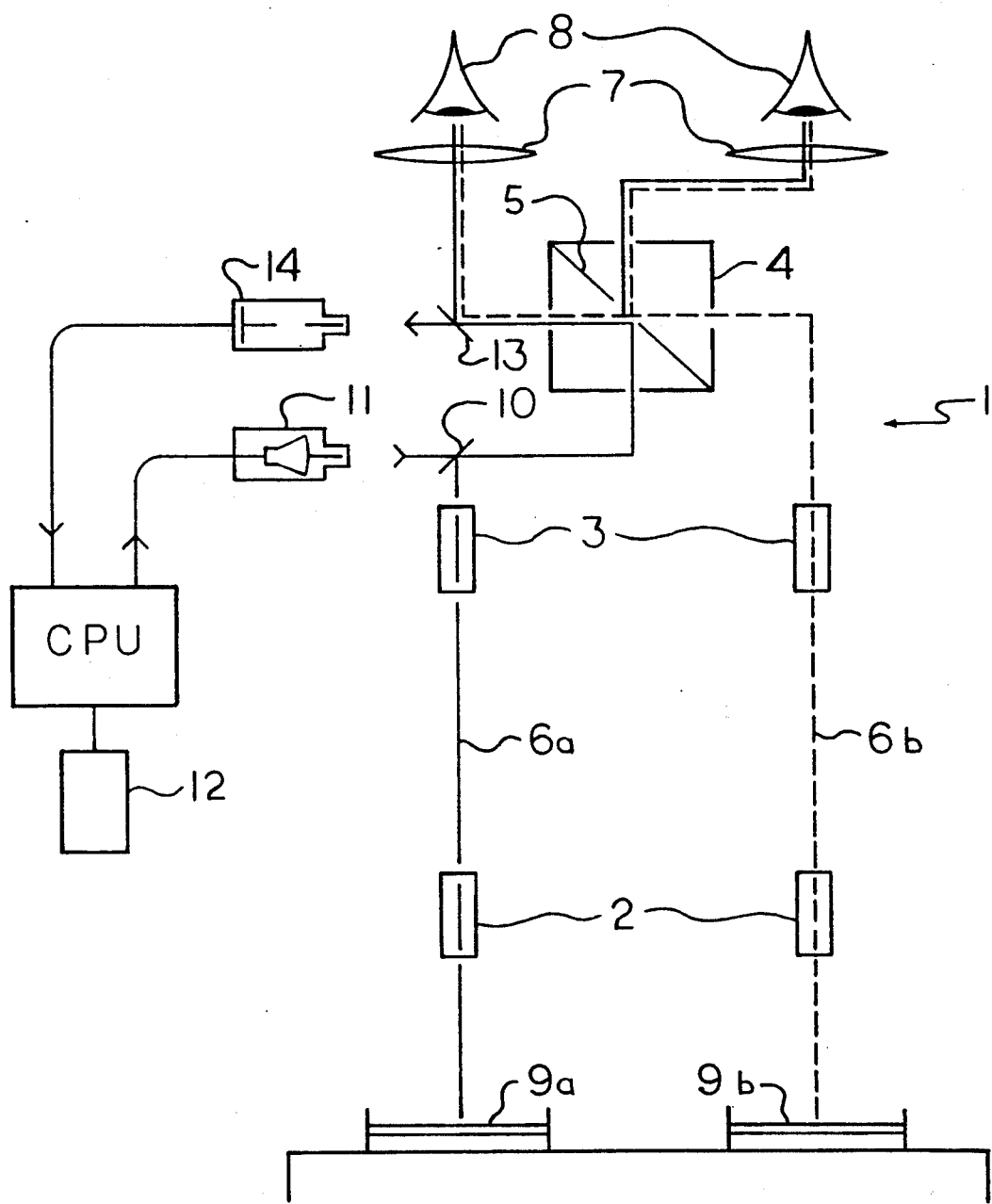

Referring to FIG. 1, a stereoscope 1 generally includes a pair of zoom system units 2, each of which usually include a stereoscope objective (not shown); a pair of image rotators 3; a mode selector 4, which in the stereo mode has a beam divider 5 and in the mono mode has a mirror 5 that directs light from each of a pair of optical systems 6a,6b to eyepieces 7. Thus, when the mode selector 4 is slid to the position placing the beam divider 5 on the optical paths of systems 6a,6b, a portion of the light from each optical system is directed to both eyes 8 and when the mode selector 4 is slid to position mirror 5 on the optical paths of systems 6a,6b, the light of each respective system is only directed to a respective one of eyes 8. In practice, with the mode selector 4 positioning the beam divider 5 on the optical paths, object 9a is presented to both eyes 8 and object 9b is presented to both eyes 8 as superimposed images. Optical system 6a has a beamsplitter 10 which allows images from CRT 11 to be introduced into the path of optical system 6a. Read/write storage device 12 contains digitally stored images and may be either of the hard disk, floppy disk, optical disk or tape variety. Digital information from read/write storage device 12 is processed by the CPU and is sent as electrical signals to CRT 11 which converts the electrical signals to a visual image that is introduced into optical system 6a through beamsplitter 10. Software such as that available from Autometric Incorporated of 5301 Shawnee Road, Alexandria, Va., may be used for converting the digital images to visual images, as well as magnifying, rotating and/or warping the images as they are converted. By warping, Applicants mean changing the image shape in one or more directions. Anamorphic lens systems are available for optically accomplishing this as well as software systems from Autometric Incorporated. In practice, recorded images which may be graphical overlays, alphanumeric information, grids, wire frame models or previously recorded objects, may be introduced into optical system 6a via CRT 11.

Slidable mirror 13 is selectively positionable on the path of optical system 6a. When mirror 13 is not positioned on the path of optical system 6a, light will be directed to detector 14 which changes the light to electrical signals that are passed to the CPU for recording as digital images by read/write storage device 12. Images being received by detector 14 may be magnified, rotated and/or warped as they are processed by the CPU for recording by read/write storage device 12. The image of object 9a can also be magnified and/or rotated by the respective zoom system unit 2 or image rotator 3 prior to presentation to detector 14. An anamorphic lens system (not shown) can also be used to warp the image prior to detector 14.

What is claimed is:

1. In a stereoscope for viewing first and second objects having first and second optical systems with each system having an objective zoom unit, an image rotator and an eyepiece, the improvement comprising softport means, said softport means comprising storage means for digitally storing a recorded image, converting means for changing said recorded image to a visible image and means for introducing said visible image into one of said optical systems.

2. The improvement of claim 1 wherein said means for introducing said visible image includes a beamsplitter.

3. The improvement of claim 2 wherein said means for introducing said visible image is located between said image rotator and said eyepiece.

4. The improvement of claim 3 wherein said means for converting said recorded image includes a CPU and a CRT.

5. The improvement of claim 4 wherein said recorded image is magnified, rotated and/or warped while being converted to said visible image.

6. The improvement of claim 5 wherein said CPU uses software to magnify, rotate and/or warp said recorded image.

7. The improvement of claim 1 wherein said means for converting said recorded image to a visible image includes a CPU and a CRT.

8. The improvement of claim 1 wherein said stereoscope further includes a mode selector for selectively connecting said systems to permit an observer to select a first mode wherein said first object is viewed through the eyepiece of the first system and the second object is viewed through the eyepiece of second system, a second mode wherein said first object is viewed through the eyepiece of said first and second systems, a third mode wherein said second object is viewed through the eyepiece of said first and second systems and a fourth mode wherein said first and second objects are viewed through the eyepiece of said first and second systems.

9. The improvement of claim 8 wherein said visible image is viewed through the eyepiece of said first system.

10. The improvement of claim 9 wherein said visible image is viewed superimposed on said first object.

11. The improvement of claim 10 wherein said visible image is viewed superimposed on said first and second objects.

12. The improvement of claim 8 wherein said visible image is viewed through the eyepiece of said first and second systems.

13. The improvement of claim 12 wherein said visible image is viewed superimposed on said second object.

14. The improvement of claim 1 wherein said one of said optical systems further includes recording means, said recording means comprising diverting means to direct an optical image from said one of said optical systems, modifying means for changing said optical image to a digital image, and means for storing said digital image.

15. The improvement of claim 14 wherein said diverting means includes a mirror selectively removable from said one of said optical systems.

16. The improvement of claim 15 wherein said converting means includes a CPU.

17. The improvement of claim 16 wherein said converting means magnifies, rotates and/or warps said recorded image to be consistent with the first object as viewed.

18. The improvement of claim 17 wherein said CPU uses software to magnify, rotate and/or warp said optical image.

19. The improvement of claim 14 wherein said modifying means includes a CPU.

20. The improvement of claim 19 wherein said modifying means includes a CPU.

21. The improvement of claim 20 wherein said modifying means magnifies, rotates and/or warps said optical image while changing to a digital image.

22. The improvement of claim 21 wherein said CPU uses software to magnify, rotate and/or warp said recorded image.

* * * * *